(12) United States Patent
Korbee et al.

(10) Patent No.: US 6,350,805 B1
(45) Date of Patent: Feb. 26, 2002

(54) PROCESS FOR THE PREPARATION OF A POLYAMIDE NANOCOMPOSITE COMPOSITION

(75) Inventors: Roland A. Korbee; Albert A. Van Geenen, both of Sittard (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/592,612

(22) Filed: Jun. 12, 2000

Related U.S. Application Data

(63) Continuation of application No. PCT/NL98/00702, filed on Dec. 8, 1998.

(30) Foreign Application Priority Data

Dec. 11, 1997 (NL) ............................................. 1007767

(51) Int. Cl.[7] ................................................. C08K 3/34
(52) U.S. Cl. ....................................... 524/446; 523/223
(58) Field of Search ........................... 524/446; 523/223

(56) References Cited

U.S. PATENT DOCUMENTS

| | | |
|---|---|---|
| 4,739,007 A | 4/1988 | Okada et al. |
| 4,894,411 A | 1/1990 | Okada et al. |
| 5,102,948 A | 4/1992 | Deguchi et al. |
| 5,248,720 A | 9/1993 | Deguchi et al. |

*Primary Examiner*—Kriellion A. Sanders
(74) *Attorney, Agent, or Firm*—Pillsbury Winthrop LLP

(57) ABSTRACT

The invention relates to a process for the preparation of a polyamide nanocomposite composition by mixing in the melt phase a polyamide, a solid substance composed of anisotropic particles with a high aspect ratio and a liquid, the liquid being added to and subsequently mixed with a melt comprising at least the polyamide. Preferably water is chosen as the liquid.

Figure 1:

The invention also relates to a polyamide nanocomposite composition obtained by mixing in the melt phase a polyamide and a non-swollen solid substance composed of particles with a high aspect ratio.

The polyamide nanocomposite compositions obtained with the process according to the invention and the polyamide nanocomposite compositions according to the invention can be used in all moulded parts which can be produced with a polyamide composition and which demand particularly good mechanical properties, for example for use in the motor compartment of a vehicle, for casings and for connectors.

17 Claims, 2 Drawing Sheets

PROCESS FOR THE PREPARATION OF A POLYAMIDE NANOCOMPOSITE COMPOSITION

This is a Continuation of International Appln. No. PCT/NL98/00702 filed Dec. 8, 1998 which designated the U.S.

The invention relates to a process for the preparation of a polyamide nanocomposite composition by mixing in the melt phase a polyamide, a solid substance composed of anisotropic particles with a high aspect ratio and a liquid.

In the context of the present application 'a nanocomposite composition' will be understood to be a mixture of two or more materials, the mixture at least comprising a first material being a polymer and a second material being anisotropic particles with a large aspect ratio having dimensions in the nanometre area, the second material being dispersed in the first material, and the mixture possessing excellent mechanical properties, in particular a higher heat deflection temperature, impact resistance, stiffness and tensile strength and very good gas-diffusion barrier properties, in comparison with a polyamide composition not comprising this second material.

Such a process is known from EP-A-398.551 (Ube/Toyota). The process according to EP-A-398.551 is used to successively (a) preswell a clay in the presence of water and 12-aminododecanoic acid, (b) further swell the preswollen clay in the presence of water and ε-caprolactam, (c) prepare a dispersion consisting of the swollen clay, water, ε-caprolactam and nylon-6 and (d) melting and kneading the dispersion.

The process described in EP-A-398.551 involves the drawback that it is time-consuming because the anisotropic particles with a high aspect ratio are introduced into the polyamide composition by first causing the solid substance composed of anisotropic particles with a high aspect ratio to swell before the mixture is melted and kneaded. According to EP-A-398.551 the swelling is thus carried out in two steps, in the presence of water and 12-aminododecanoic acid at 80° C. for 60 minutes, and in the presence of water and ε-caprolactam for an unspecified time with constant stirring, respectively. The aim of effecting the swelling is to increase the distance between the anisotropic particles with a high aspect ratio in the solid substance composed of these anisotropic particles so that the anisotropic particles are, during the mixing in the melt phase, released form the swellable solid substance and dispersed in the melt.

An additional drawback of the process described in EP-A-398.551 is that it is necessary to use specific swelling agents, in this case 12-aminododecanoic acid and ε-caprolactam, which may give rise to undesired side-reactions in the polymer melt, leading to, inter alia, an impure composition and consequently an inferior end product.

Another drawback of the process described in EP-A-398.551 is that liquids, more specifically dispersing agents and swelling agents, for example water, organic compounds or mixtures of water and organic compounds present in the mixture that is melted, escape as vapours during the melting, for example via the feed opening of an extruder, and consequently give rise to processing problems, for example in the melting and kneading of the melt, as a result of which a polyamide nanocomposite composition of inferior quality is obtained, in particular the composition is discoloured or it comprises gas pockets.

The invention's aim is to provide a process that comprises fewer steps and can hence be carried out more quickly, in which it is not necessary for the solid substance composed of anisotropic particles with a high aspect ratio to be swollen before the solid substance is mixed with a polyamide and in which no processing problems occur as a result of the presence of a liquid in the mixture that is melted.

This aim is achieved by adding the liquid to, and subsequently mixing it with a melt comprising at least the polyamide.

An additional advantage of the process according to the invention is that the melt, comprising at least the polyamide, the solid substance composed of anisotropic particles with a high aspect ratio and the liquid, can be kneaded and processed at a temperature lower than the polyamide's melting temperature. It was also found that the melt, consisting of at least the polyamide, the solid substance composed of anisotropic particles with a high aspect ratio and the liquid, has a viscosity that is lower than the viscosity of a melt of the polyamide alone, as a result of which less energy need to be supplied to the mixing apparatus during the kneading and less shear heat is developed in the melt. As a result of the lowering of both the melt's processing temperature and the melt's viscosity there is a smaller risk of gel formation or chain break-up during the mixing in the melt phase, as a result of which a better end product is obtained.

In principle, all the usual solvents or mixtures thereof can be used as the liquid. Preferably a compound or mixture of compounds is chosen which is at least partly miscible with the polyamide in the melt phase or which is capable of causing a solid substance composed of anisotropic particles with a high aspect ratio to swell. 'Mixtures' are in this context also understood to be mixtures comprising a compound that is a good swelling agent, but is poorly miscible with a polyamide melt, and a compound that is not a good swelling agent, but is well miscible with a polyamide melt. The liquid is for example chosen from the group comprising water; aliphatic and cycloaliphatic hydrocarbons which may optionally be substituted, for example heptane, cyclohexane or dichloromethane; aromatic hydrocarbons which may optionally be substituted, for example benzene, toluene, xylene, chlorobenzene, dichlorobenzene, trichlorobenzene or nitrobenzene; ethers, for example dioxane, diethyl ether or tetrahydrofuran; ketones, for example cyclohexanone or acetophenone; esters, for example ethyl acetate or propiolactone; nitrites, for example acetonitrile or benzonitrile; alcohols, for example methanol, ethanol, n-propanol or isopropanol; or mixtures thereof. Particularly suitable is water or an aqueous mixture of one or more of the aforementioned compounds. It has surprisingly been found that the process according to the invention using water as the liquid caused no substantial degradation of the polyamide, whereas it is nevertheless commonly known that a polyamide degrades at a temperature of more than 100° C. in the presence of water, i.e. that chain break-up takes place, for example in an extruder, at a normal residence time of 2 to 4 minutes. Water is also—from an environmental viewpoint—a better choice for the liquid than for example an aromatic hydrocarbon.

The amount of liquid that can be used is not critical. The amount of liquid is preferably 5–50% by weight, more preferably 10–40% by weight, relative to the weight of the polyamide.

As the polyamide any polymer can be chosen that comprises acid-amide bonds (—CONH—) between the repeating units, more in particular polyamides or copolyamides obtained from ε-caprolactam, 6-aminocaproic acid, ω-enantholactam, 7-aminoheptanoic acid, 11-aminodecanoic acid, 9-aminononanoic acid, α-pyrrolidone or α-piperidone; polymers or copolymers obtained through the polycondensation of diamines, for example hexamethylene diamine, nonamethylene diamine, undecamethylene diamine, dodecamethylene diamine or metaxylene diamine, with dicarboxylic acids, for example terephthalic acid, isophthalic acid, adipic acid or sebacic acid; blends of the aforementioned polymers and copolymers. Examples of such polymers are nylon-6, nylon-9, nylon-11, nylon-12, nylon-4,6 and nylon-6,6. Preferably nylon-6 is chosen.

The polyamide preferably has an average molecular weight of between 9,000 and 40,000.

As the solid substance composed of anisotropic particles with a high aspect ratio a solid substance is preferably chosen from the group comprising layered and fibrous inorganic materials.

A particle's 'aspect ratio' is in the context of this invention understood to be the ratio of an individual particle's largest and smallest dimension. More in particular the aspect ratio of a plate is the ratio of the plate's length and average thickness and the aspect ratio of a fibre is the ratio of the fibre's length and average diameter. Preferably a solid substance is chosen that is composed of anisotropic particles with a high aspect ratio, the aspect ratio lying between 5 and 10,000, preferably between 10 and 10,000, more preferably between 100 and 10,000.

Suitable layered inorganic materials are composed of plates with an average aspect ratio of between 5 and 10,000, the plates having an average thickness equal to or less than about 2.5 nm and a maximum thickness of 10 nm, preferably of between about 0.4 nm and about 2.5 nm, more preferably of between about 0.4 nm and about 2 nm. The average length of the plates is preferably between about 2 nm and 1,000 nm. Examples of suitable layered inorganic materials are phyllosilicates, for example smectite clay minerals, vermiculite clay minerals and micas. Examples of suitable smectite clay minerals are montmorillonite, nontronite, beidellite, volkonskoite, hectorite, stevensite, pyroysite, saponite, sauconite, magadiite and kenyaite. Preferably montmorillonite is chosen.

In the suitable fibrous inorganic materials the individual fibres have an average aspect ratio of between 5 and 10,000, the individual fibres' diameter being equal to or smaller than about 10 nm, with a maximum diameter of 20 nm, preferably between about 0.5 nm and about 10 nm, more preferably between about 0.5 nm and about 5 nm. The average length of the individual fibres in suitable fibrous inorganic materials is usually equal to or smaller than about 2,000 nm, with a maximum length of about 10,000 nm, preferably between about 20 nm and about 200 nm, more preferably between about 40 nm and about 100 nm. Examples of suitable fibrous inorganic materials are imogolite and vanadium oxide.

The amount of solid substance composed of the anisotropic particles with a high aspect ratio can be freely chosen; the amount is dependent only on the desired properties of the polyamide nanocomposite composition to be obtained. Preferably an amount is chosen of between 0.05% by weight and 30% by weight, relative to the polyamide.

The polyamide nanocomposite composition optionally comprises other polymers, but the amount of these other polymers must be chosen so that they do not interfere with the execution of the invention. Examples of such polymers are polypropylene (PP), acrylonitrile-butadiene-styrene (ABS), polyphenylene oxide (PFO), polycarbonate (PC), polyethylene terephthalate (PET) and polybutylene terephthalate (PBT).

The polyamide nanocomposite composition optionally comprises additives, for example fillers and reinforcing materials, for example glass fibres and silicates, for example talcum, flame retardants, foaming agents, stabilisers, flow-promoting agents and pigments.

Although the process according to the invention is particularly suitable for the preparation of a nanocomposite composition by mixing in the melt phase a polyamide, a non-swollen solid substance composed of anisotropic particles with a high aspect ratio and a liquid, the invention is not impeded by the fact that the process can also be carried out using a swollen solid substance composed of the anisotropic particles with a high aspect ratio, in which case the swelling can be effected in any manner known to a person skilled in the art, for example as described in EP-A-398,551.

To mix the liquid with the polyamide melt, use is preferably made of a mixing device fitted with means for adding a liquid to the melt in a controlled manner and for preventing the escape of the liquid during the mixing and kneading process. The mixing device may also be fitted with means for allowing the liquid to escape in a controlled manner, for example before the melt leaves the mixing device.

In a preferred embodiment the melt, which comprises at least the polyamide, also already comprises the solid substance composed of anisotropic particles with a high aspect ratio before the liquid is mixed with the melt.

In a second preferred embodiment the solid substance composed of anisotropic particles with a high aspect ratio is dispersed in the liquid and the dispersion thus obtained is mixed with the polymer melt, which comprises at least the polyamide.

A mixed form of the aforementioned two preferred embodiments can of course also be used.

Any method known to a person skilled in the art can be used to mix the melt, more in particular a method that exerts shear forces on a polymer melt. Preferably the mixing is effected with the aid of the equipment usually used for mixing a polymer melt, for example stirrers, Banburry-type mixers, Brabender-type mixers, continuous mixers or extruders. Preferably an extruder is used. In a preferred embodiment an extruder is used that is successively fitted with a melting part, a contra-rotating part, an injection gate for adding water, a second contra-rotating part and a degassing gate. In the zone between the two contra-rotating parts the water is mixed with the polymer melt and the solid substance composed of anisotropic particles with a high aspect ratio under pressure and at an elevated temperature. The pressure in this zone is typically 1–1.5 MPa. It is important that the liquid cannot substantially escape from the mixing zone during the mixing. The melt is preferably kneaded at a pressure of more than 1 atmosphere and at a temperature lower than the polyamide's melting temperature. The water can optionally be removed from the melt in its entirety or in part before the composition leaves the mixing apparatus, for example via a degassing gate in an extruder that is for example operated at lowered pressure.

The invention also relates to a polyamide nanocomposite composition obtained by mixing in the melt phase a polyamide and a non-swollen solid substance composed of particles with a high aspect ratio. From EP-A-398.551 (Ube/Toyota) a polyamide nanocomposite composition is known that has been obtained by mixing a swollen montmorillonite clay in the melt phase with nylon-6 (Table 1, Comparative Example A). A drawback of this composition is that the solid substance has to be swollen before being mixed with the melt. Also known from EP-A-398.551 is a composition by mixing in the melt phase a non-swollen montmorillonite clay and nylon-6 (Table 1, Comparative Example B). The montmorillonite plates are not dispersed in this composition and the composition has properties that are not better than those of a similar composition without the montmorillonite clay, in particular a Heat Distortion Temperature (HDT) that does not differ appreciably from that of a commercially available nylon-6 (Table 1, Comparative Example C). The polyamide nanocomposite composition according to the invention however has a HDT that is comparable with the HDT of the polyamide nanocomposite composition according to EP-A-398.551. The polyamides and solid substances and their amounts described above in this patent can be chosen as the polyamide and the solid substance comprising the anisotropic particles with a high aspect ratio, respectively.

The polyamide nanocomposite compositions obtained with the process according to the invention and the polyamide nanocomposite compositions according to the invention can be used in all moulded parts which can be produced with a polyamide composition and which demand particularly good mechanical properties, for example for use in the motor compartment of a vehicle, for casings and for connectors.

The invention will now be elucidated with reference to examples, without being limited hereto.

EXAMPLES

Example I and Comparative Examples A. B and C

Nylon-6 (Akulon K123, DSM N.V.) was cryogenically ground to a particle size of <1 mm. 4750 g of the ground nylon-6 and 250 g of montmorillonite clay (Kunipia F, Kunimine Industries) were mixed in a tumbler. The (dry) powder mixture was dosed to a ZSK twin-screw extruder (Werner & Pfleiderer) having a screw diameter of 30 mm and a length/diameter ratio of 39. The screw was fitted with, successively (from the feed opening), a melting part, a contra-rotating part, an injection gate for the introduction of water, a second contra-rotating part and a degassing gate. The extruder temperature was set to a value varying from 190 to 215° C. over the entire length of the cylinder, which is lower than the melting temperature of the nylon-6. The dry clay/nylon mixture was continuously fed to the extruder at a throughput of 4 kg per hour. Water was injected into the melt at a throughput of 20 g per minute (which corresponds to about 30% by weight of water, relative to the nylon-6). The water that was injected into the melt was discharged via the degassing gate at the end of the extruder at a pressure varying from 3 to 6 kPa. The polyamide nanocomposite composition was extruded as a strand which was cooled in water. The strand was chopped into granules with a length of approx. 3 mm and a diameter of approx. 2 mm. A film was pressed from the polyamide nanocomposite composition thus obtained, tested for Rheometric Strain Analysis (RSA), a technique with which the modulus of elasticity is measured as a function of the temperature. The Heat Distortion Temperature (HDT) was inferred from the RSA measurement and is indicated in Table 1. Also included in this table are the HDT values of a commercial grade of nylon-6 polyamide (Akulon K123, DSM N.V.) and of a polyamide composition prepared using swollen and non-swollen montmorillonite according to EP-A-398.551, (Example 1 and Comparative Example 7).

From Table 1 it is clear that the composition prepared according to the invention (Example I) has a comparable HDT as the composition prepared according to the state of the art (example A). Also, it is shown that the composition according to the invention (Example I) outperforms the composition according to the state of the art (Example B).

Figure 2:
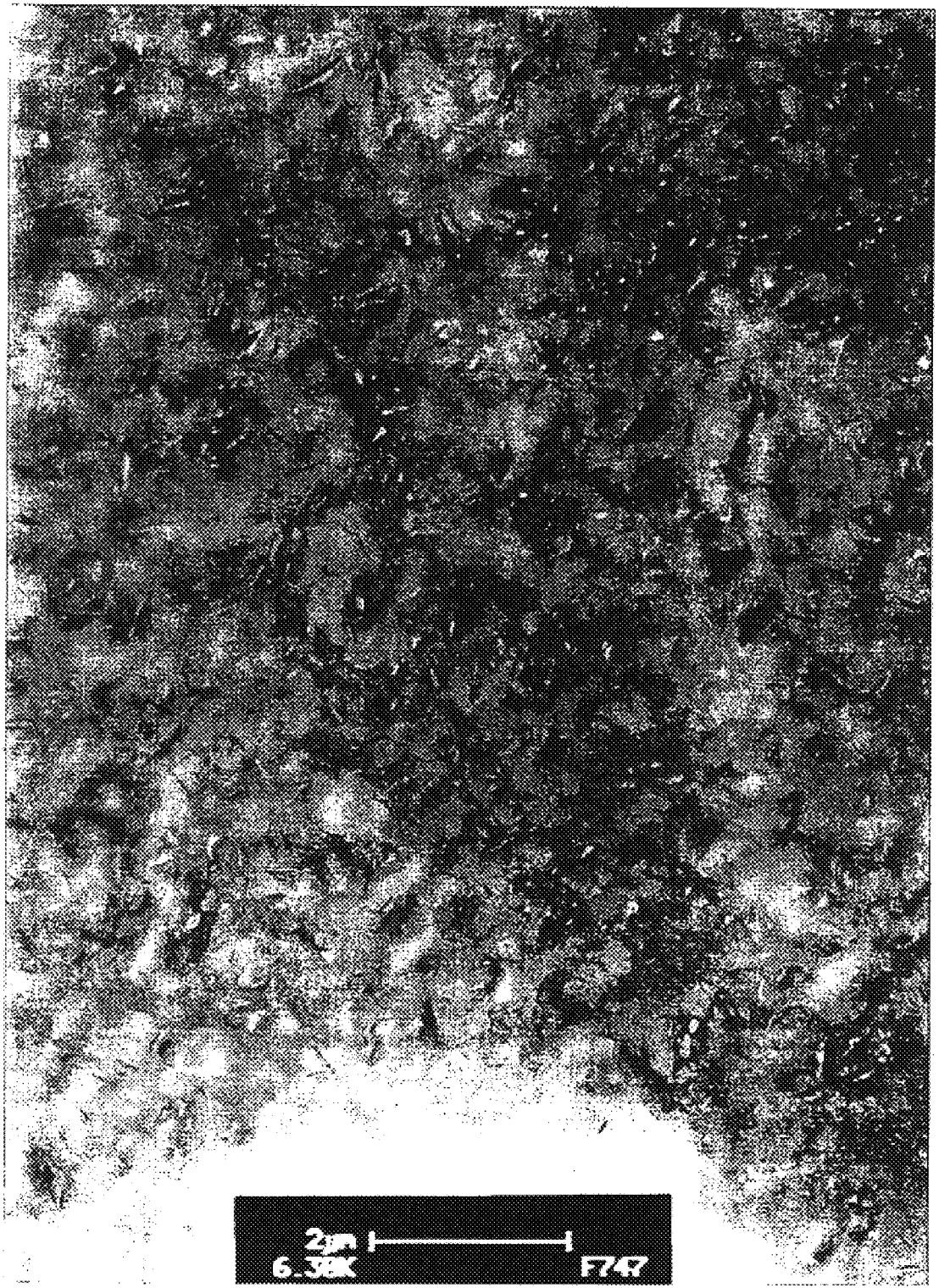

Transmission Electron Microscopy (TEM) photographs were made of a cross-section of a slice (thickness 70 nm) of a granule of the polyamide nanocomposite composition of Example I (FIG. 1: enlarged 19,000 x, scale bar=2 micrometres; FIG. 2: enlarged 99,000 x, scale bar=500 nm). In the photos it can be seen that the montmorillonite clay plates are homogeneously dispersed in de nylon-6 matrix, which proves the effectiveness of the measures according to our invention to produce a nanocomposite composition.

TABLE 1

Polyamide nanocomposite compositions

|  | Example I | Comparative Example A | Comparative Example B | Comparative Example C |
|---|---|---|---|---|
| Polymer | Nylon-6 nanocomposite according to the invention | Nylon-6 nanocomposite (EP-A-398.551, Example 1) | Nylon-6 Composition (EP-A-398.551, Comparative Example 7) | Nylon-6 Akulon K123 (DSM N.V.) |
| Clay | non-swollen montmorillonite | swollen montmorillonite | non-swollen montmorillonite | none |
| Clay (% by weight) | 5 | 5.3 | 2 | 0 |
| HDT (° C.) | 152 | 163 | 92 | 96 |

What is claimed is:

1. Process for the preparation of a polyamide nanocomposite composition by mixing in the melt phase a polyamide, a solid substance composed of anisotropic particles with a high aspect ratio and a liquid wherein the aspect ratio is at least 5, characterised in that the liquid is added to and subsequently mixed with a melt which comprises at least the polyamide.

2. Process according to claim 1, wherein the melt, which comprises at least the polyamide, also comprises the solid substance composed of anisotropic particles with a high aspect ratio before the liquid is mixed with the melt.

3. Process according to claim 1, wherein the liquid comprises the solid substance composed of anisotropic particles with a high aspect ratio.

4. Process according to claim 1, wherein water is chosen as the liquid.

5. Process according to claim 1, wherein the amount of liquid is preferably 5–50% by weight, more preferably 10–40% by weight, relative to the weight of the polyamide.

6. Process according to claim 1, wherein nylon-6 is chosen as the polyamide.

7. Process according to claim 1, wherein the anisotropic particles have an aspect ratio of between 5 and 10,000.

8. Process according to claim 1, wherein the solid substance that is composed of anisotropic particles with a high aspect ratio is chosen from the group comprising layered and fibrous inorganic materials.

9. Process according to claim 8, wherein montmorrillonite is chosen as the layered inorganic material.

10. Process according to claim 1, wherein the amount of solid substance equals 0.05–30% by weight, relative to the polyamide.

11. Process according to claim 1, wherein the solid substance that is composed of anisotropic particles with a high aspect ratio is not swollen.

12. Process according to claim 1, wherein the liquid is mixed with the melt under pressure.

13. Process according to claim 1, wherein the mixing in the melt phase is effected with the aid of an extruder.

14. Process according to claim 13, wherein the extruder is successively fitted with at least a melting part, a contra-rotating part, an injection gate for introducing the liquid, a second contra-rotating part and a degassing gate.

15. Polyamide nanocomposite composition obtained with the process according to claim 1, wherein the solid substance that is composed of anisotropic particles with a high aspect ratio is not swollen.

16. Polyamide nanocomposite composition obtained by mixing in the melt phase a polyamide and a non-swollen solid substance composed of anisotropic particles with a high aspect ratio, the composition having a HDT equal to or above 150° C., wherein the high aspect ratio is at least 5.

17. Moulded part consisting of at least a polyamide nanocomposite composition according to claim 15.

* * * * *